United States Patent
Thompson et al.

(10) Patent No.: US 10,326,875 B2
(45) Date of Patent: Jun. 18, 2019

(54) SYSTEM AND METHOD FOR PROVISION OF APPLIANCE CONTROL FUNCTIONALITY TO A SMART DEVICE

(71) Applicant: Universal Electronics Inc., Santa Ana, CA (US)

(72) Inventors: Brandt Thompson, Newport Coast, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 15/727,407

(22) Filed: Oct. 6, 2017

(65) Prior Publication Data

US 2018/0034953 A1 Feb. 1, 2018

Related U.S. Application Data

(63) Continuation of application No. 15/364,620, filed on Nov. 30, 2016, now Pat. No. 9,813,543, which is a
(Continued)

(51) Int. Cl.
*H04W 4/80* (2018.01)
*H04M 1/725* (2006.01)
(Continued)

(52) U.S. Cl.
CPC .... *H04M 1/72533* (2013.01); *H04B 10/1149* (2013.01); *H04M 1/7253* (2013.01); *H04N 5/4403* (2013.01); *H04N 21/4183* (2013.01); *H04N 21/4222* (2013.01); *H04W 4/80* (2018.02); *H04N 2005/4405* (2013.01)

(58) Field of Classification Search
CPC .... G08C 19/28; G08C 23/04; G07C 9/00182; H04M 1/72533; H04M 1/7253; H04W 4/80; H04B 10/1149; H04N 5/4403; H04N 21/4183; H04N 21/4222
USPC .......... 340/12.22, 12.23, 12.28, 12.29, 12.5, 340/12.51, 12.55
See application file for complete search history.

(56) References Cited

U.S. PATENT DOCUMENTS

| 7,379,778 B2 | 5/2008 | Hayes et al. |
| 7,952,467 B2 | 5/2011 | Hardacker |
(Continued)

FOREIGN PATENT DOCUMENTS

WO 2010/111426 A1 9/2010

OTHER PUBLICATIONS

European Patent Office, Office Action issued on European patent application No. 13834777.8, dated Mar. 21, 2017, 6 pages.
(Continued)

*Primary Examiner* — Hai Phan
*Assistant Examiner* — Anthony D Afrifa-Kyei
(74) *Attorney, Agent, or Firm* — Greenberg Traurig, LLP

(57) ABSTRACT

A system for use in issuing commands to a plurality of appliances each of a specific one of a plurality of different appliance types includes a smart device adapted to transmit command communications and a plurality of low-energy consuming controllers each adapted to transmit a command to a one of the plurality of appliances of a specific one of the plurality of different appliance types in response to receipt of a command communication originating from the smart device.

11 Claims, 7 Drawing Sheets

Related U.S. Application Data continuation of application No. 13/602,435, filed on Sep. 4, 2012, now Pat. No. 9,548,813.

(51) Int. Cl.
*H04B 10/114* (2013.01)
*H04N 5/44* (2011.01)
*H04N 21/418* (2011.01)
*H04N 21/422* (2011.01)

(56) References Cited

U.S. PATENT DOCUMENTS

| | | | |
|---|---|---|---|
| 8,508,345 B2* | 8/2013 | Mornhineway | G08C 17/02 340/12.22 |
| 2004/0174824 A1 | 9/2004 | Ohta et al. | |
| 2006/0129308 A1* | 6/2006 | Kates | A61H 3/061 701/532 |
| 2007/0037522 A1 | 2/2007 | Liu et al. | |
| 2007/0139214 A1* | 6/2007 | Andersen | G08C 17/02 340/12.29 |
| 2008/0137572 A1 | 6/2008 | Park et al. | |
| 2008/0151795 A1 | 6/2008 | Shorty | |
| 2008/0313418 A1* | 12/2008 | Kwon | G11C 7/1051 711/166 |
| 2009/0113478 A1* | 4/2009 | Haughawout | G01C 21/3682 725/40 |
| 2009/0239587 A1 | 9/2009 | Negron et al. | |
| 2011/0063094 A1 | 3/2011 | Meiertoberens et al. | |
| 2011/0289113 A1* | 11/2011 | Arling | G08C 17/02 707/769 |
| 2012/0019674 A1 | 1/2012 | Ohnishi | |
| 2012/0068669 A1 | 3/2012 | Trainor et al. | |
| 2012/0086563 A1 | 4/2012 | Arling et al. | |
| 2012/0242526 A1 | 9/2012 | Perez et al. | |
| 2013/0117395 A1 | 5/2013 | Bushmitch et al. | |
| 2013/0171981 A1* | 7/2013 | Woo | G08C 17/02 455/420 |

OTHER PUBLICATIONS

ISA/US, International Search Report and Written Opinion issued on PCT application No. US13/55795, dated Feb. 3, 2014, 16 pages.

European Patent Office, extended European search report issued on European patent application No. 13834777.8, dated Jun. 17, 2015, 10 pages.

* cited by examiner

SYSTEM AND METHOD FOR PROVISION OF APPLIANCE CONTROL FUNCTIONALITY TO A SMART DEVICE

RELATED APPLICATION INFORMATION

This application claims the benefit of and is a continuation of U.S. application Ser. No. 15/364,620, filed on Nov. 30, 2016, which application claims the benefit of and is a continuation of U.S. application Ser. No. 13/602,435, filed on Sep. 4, 2012, the disclosures of which are incorporated herein by reference in their entirety.

BACKGROUND

Personal communication, productivity, and entertainment devices such as cellular phones, PDAs, portable email devices, tablet computers, e-books, hand-held games, portable media players, etc. (all referred to hereafter as "smart devices") are known to include features such as graphical user interfaces on color touch screens, Bluetooth and/or WiFi capability, etc. Increasingly, such smart devices also incorporate support for ancillary applications (hereafter referred to as "apps") for example calendars, email, maps and navigation, etc. Such ancillary applications may be pre-installed in a smart device or may be made available for download by a user. Certain apps may comprise an ability to issue commands to entertainment and other appliances, for example in conjunction with a GUI offering the features and functionality of a universal remote control, as a user convenience in conjunction with a TV guide display to enable channel selection, etc.

In order to effect such control functionality, it is known in the art to provision a smart device with hardware and/or firmware suitable for the generation of appliance command signals. Provision of such hardware and/or firmware may be internal, i.e., built into a smart device; may be external, i.e., in the form of add-on attachments to a smart device; or may be discrete, i.e., in the form of a separate self-contained unit which receives wireless signals from a smart device and converts them to appropriate appliance command transmissions. In particular, it is known in the art to provide a single self-contained bridge device comprising for example a receiver, a processing/translation means, and a transmitter, which bridge device is capable of receiving generic appliance command requests from a smart device via, for example, an RF link such as Bluetooth or WiFi and translating these command requests into appliance-recognizable transmissions, these transmissions usually (but not necessarily) taking the form of infrared ("IR") encoded signals which may emulate the various target appliances' original equipment remote controls. The availability of such bridge devices greatly facilitates the deployment of remote control apps for smart devices, since smart device apps intended for use in conjunction with these bridge devices may then comprise a simple software GUI with no requirement for additional hardware or firmware installed onto or built into the smart device. Known bridge devices, for example such as described in co-pending U.S. patent application Ser. No. 12/406,601, entitled "System and Method for Appliance Control Via a Personal Communication or Entertainment Device," or U.S. patent application Ser. No. 13/071,661, entitled "System and Method for Facilitating Appliance Control Via a Smart Device," both incorporated herein by reference in their entirety, generally comprise a unitary "universal" bridge device, i.e., a device with access to a library of appliance command codes and transmission format information suitable for issuing wireless commands to multiple appliances of different type and manufacture. As described in the above referenced U.S. patent applications, an app resident on a smart device may communicate with such a bridge device in order to request the transmission of commands to various appliances, for example a television set, a set top box, a DVD player, and/or an AV receiver.

While such unitary bridge devices are operative for the purpose described, certain disadvantages remain. For example, since a unitary bridge device may be required to originate command transmissions to several different appliances, it must be positioned appropriately, especially in those cases where infrared ("IR") is the required command transmission medium and the transmitter accordingly must be located within line-of-sight of every appliance to be controlled. This may constrain a user's ability to, for example, place equipment in cabinets behind closed doors; situate the bridge device where it is inconspicuous and/or not subject to interference by curious children or visitors, etc. Furthermore, since satisfying these constraints may require placement of a bridge device at some distance from the appliances to be controlled, for example on the opposite wall of a room, the design of such unitary bridge devices must provide for adequate transmission output power with the resultant impact on battery life, device dimensions, power supply design, and the like.

SUMMARY OF THE INVENTION

This invention relates generally to systems and methods for equipping a smart device with appliance command functionality, and in particular to the provision of a discrete bridge device or series of bridge devices for receiving and converting appliance command requests from a smart device.

In order to overcome certain disadvantages of the prior art, in accordance with the instant invention appliance control capability may be provided to a smart device via multiple discrete bridge devices, one for each appliance to be controlled, as opposed to a single unitary bridge device as known in the prior art. Since each bridge device is dedicated to servicing a specific appliance, physical placement of these bridge devices may be proximate to the appliance to be controlled, for example inside an equipment cabinet, on an equipment shelf, or even attached to the face of an appliance. Furthermore, since these individual bridge devices may be purposed to be placed near the appliance to be controlled, a lower transmission output power may be employed. Additionally, as each bridge device may be dedicated to a particular appliance type, the size of the command code storage may be reduced, thus allowing use of a lower capacity microcontroller chip. When such a bridge device is further equipped with a low energy consumption RF technology such as for example Bluetooth 4.0 Low Energy ("LE") for communication with an associated smart device, a compact power source such as for example a so-called "button" or "coin" cell battery may suffice to energize the bridge device. As a result of these factors, a bridge device designed in accordance with the teachings set forth below may be both inexpensive and extremely compact.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
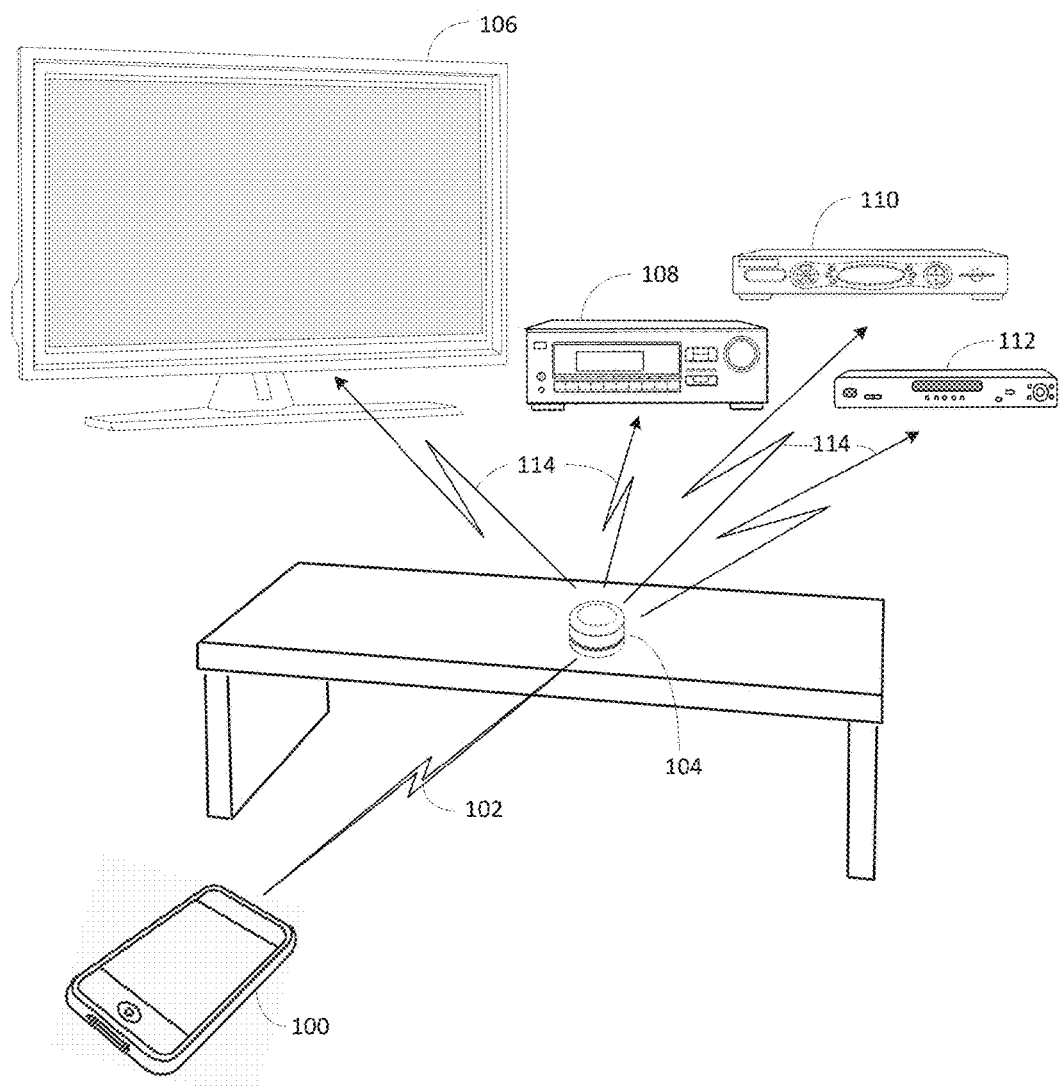
FIG. 1 illustrates an exemplary prior art system in which a unitary bridge device may be utilized by a smart device to control several appliances.

With reference to FIG. 1, there is illustrated an exemplary system according to the prior art in which an app installed on a smart device 100 may be adapted to control various controllable appliances, such as a television 106, a cable set top box combined with a digital video recorder ("DVR") 110, a DVD player 112, and an AV receiver 108. Since such remote control apps are well known, for the sake of brevity the operation, features, and functions thereof will not be described in detail herein. Nevertheless, if a more complete understanding of the nature of such apps is desired, the interested reader may turn to, for example, the before mentioned U.S. patent application Ser. No. 12/406,601 or U.S. patent application Ser. No. 13/329,940, entitled "Graphical User Interface and Data Transfer Methods in a Controlling Device," of common ownership and incorporated herein by reference in their entirety.

Transmission of commands to the appliances of FIG. 1 may be facilitated by a bridge device 104 which may receive wireless signals 102, which are caused to be transmitted via interaction with an app resident in smart phone 100, and convert these to appropriate infrared ("IR") signals 114 recognizable by the target appliances. While illustrated in the context of a television 106, DVR 110, AV receiver 108, and DVD player 112, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. Also, while illustrated in the context of IR command transmissions, it will be appreciated that in general, command transmissions by bridge device 104 may take the form of any convenient IR, RF, hardwired, point-to-point, or networked protocol, as necessary to cause the respective target appliances to perform the desired operational functions. Further, while wireless communications 102, 114, etc., between exemplary devices are illustrated herein as direct links, it should be appreciated that in some instances such communication may take place via a local area network or personal area network, and as such may involve various intermediary devices such as routers, access points, etc. Since these items are not necessary for an understanding of the instant invention, they are omitted from the Figures for the sake of clarity.

Figure 2:
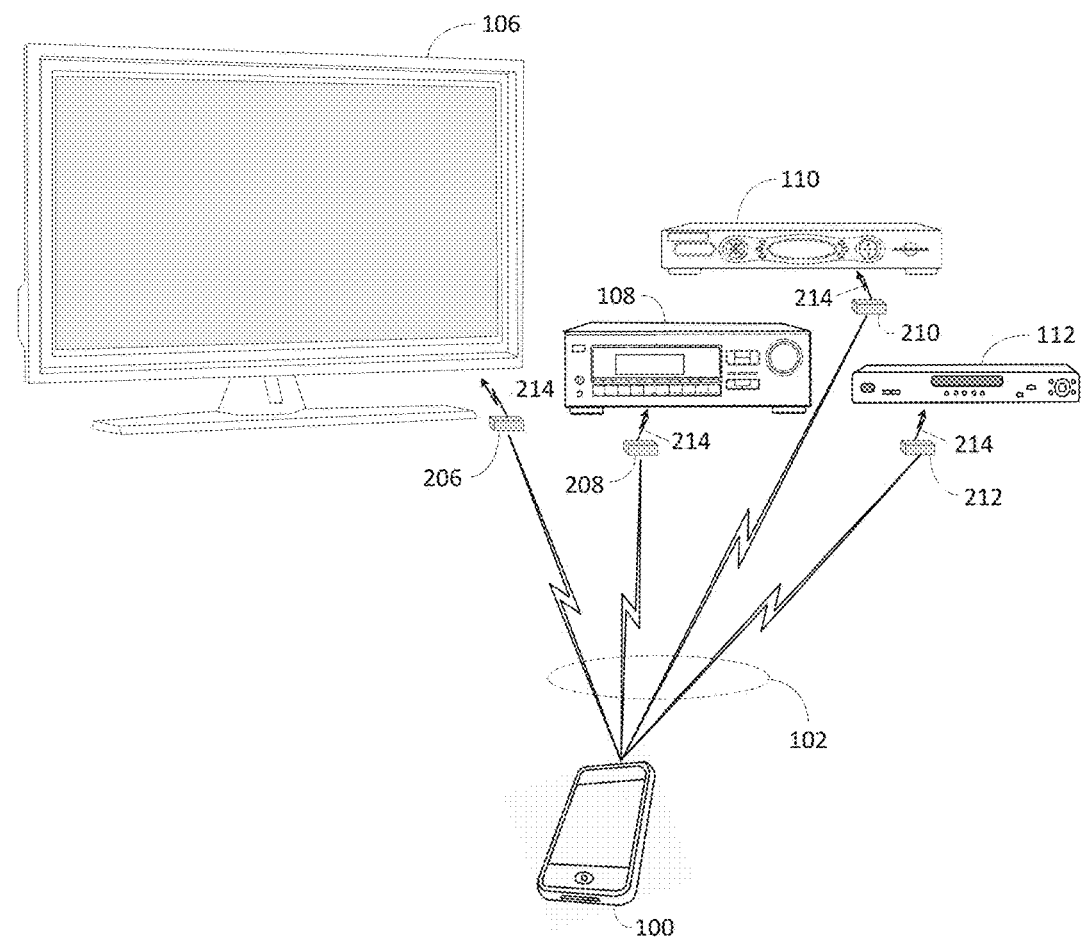
FIG. 2 illustrates an improvement to the exemplary system of FIG. 1, in which multiple discrete bridge devices may be utilized by a smart device to control several appliances.

Turning now to FIG. 2, an improved system may comprise a smart device 100 adapted to issue commands to appliances 106, 108, 110, 112 as before. However, in accordance with the teachings of this invention, each appliance may be provisioned with a discrete single-purpose bridge device 206, 208, 210, 212. Each of the bridge devices 206 through 212 may be adapted to be placed in close proximity to the appliance to which it is to issue commands, and each bridge device may be configured with a command code set appropriate to a single, specific type of appliance, e.g., bridge device 206 may be provisioned with a command code set appropriate for controlling only TV appliances, bridge device 208 may be provisioned with a command code set appropriate for controlling only AVR appliances, bridge device 210 may be provisioned with a command code set appropriate for controlling only DVR appliances, and bridge device 212 may be provisioned with a command code set appropriate for controlling only DVD player appliances. Since bridge devices 206 through 212 are physically in close proximity to their respective controlled appliances, IR signals 214 may be transmitted at a low power level.

Figure 3:
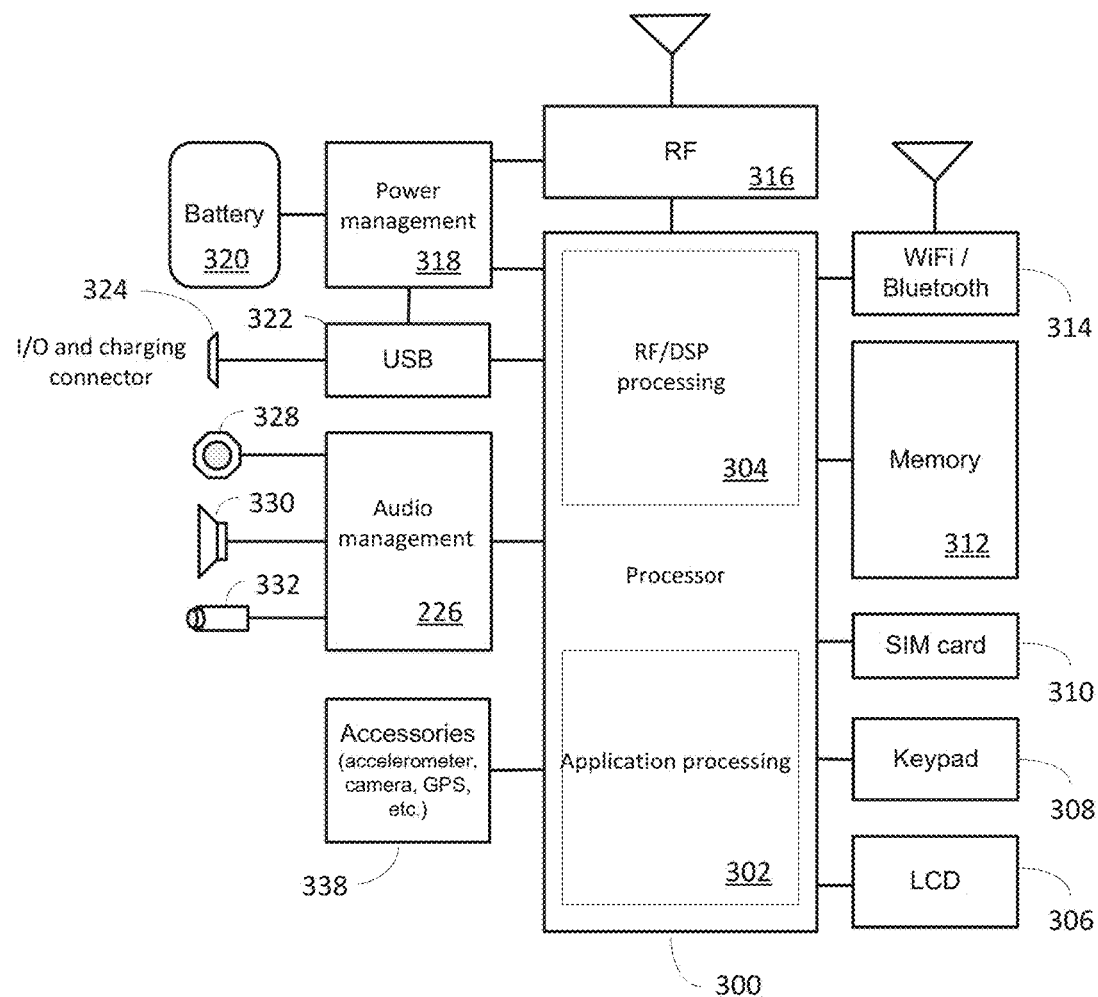
FIG. 3 illustrates in block diagram form an exemplary smart device which may be used in the exemplary systems of FIGS. 1 and 2.

With reference to FIG. 3, as is known in the art, a smart device 100 may include as needed for a particular application, processing means 300 which may comprise both an application processing section 302 and an RF/DSP processing section 304; an LCD display 306; a keypad 308 which may comprise physical keys, touch keys overlaying LCD 306, or a combination thereof; a subscriber identification module (SIM) card 310; memory means 312 which may comprise ROM, RAM, Flash, or any combination thereof; WiFi and/or Bluetooth wireless interface(s) 314; a wireless telephony interface 316; power management circuitry 318 with associated battery 320; a USB interface 322 and connector 324; an audio management system 326 with associated microphone 328, speaker 330 and headphone jack 332; and various optional accessory features 338 such as a digital camera, GPS, accelerometer, etc.

Figure 4:
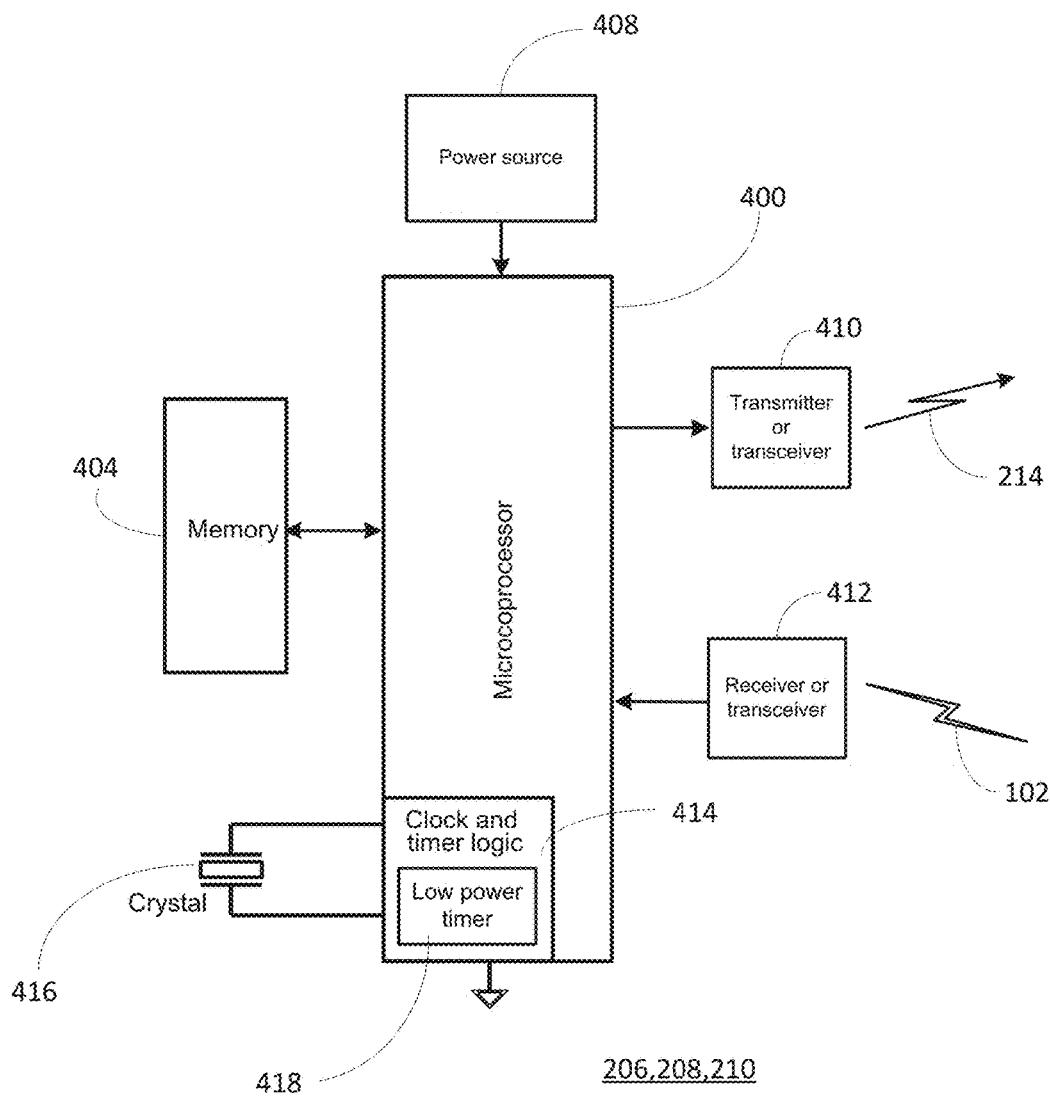
FIG. 4 illustrates in block diagram form an exemplary discrete bridge device which may be used in the exemplary system of FIG. 2.

With reference to FIG. 4, for use in commanding the functional operation of an appliance, an exemplary bridge device 206 may include, as needed for a particular application, a processor 400 coupled to memory means 404; receiver and/or transceiver circuitry 412 for communicating with a smart device 100 (preferably RF, such as WiFi, Zigbee, Bluetooth, etc., and in an exemplary embodiment Bluetooth 4.0 Low Energy); transmission and/or transceiver circuitry 410 (e.g., IR and/or RF) for issuing commands to an appliance; a compact power source 408 such as a coin or button cell battery or batteries; and clock and timer logic 414 with associated crystal or resonator 416; all contained with a compact housing suitable for mounting on or near to an appliance to be controlled. In a preferred embodiment, clock and timer logic 414 may incorporate a low power timing device 418 such as, for example, a nanopower ring oscillator as may be found in the MAXQ610 microprocessor available from Maxim Integrated Products, Inc.

As will be understood by those skilled in the art, portions of memory means 404 may include executable instructions (the bridge device program memory) that are intended to be executed by the processor 400 to control the operation of the bridge device 206, as well as data which serves to define the necessary control protocols and command values for use in transmitting command signals to a controllable appliance (collectively, the codeset data). In this manner, the processor 400 may be programmed to control the various electronic components within the bridge device 206, e.g., to monitor activity on the communication circuit 412, to cause the transmission of signals, etc. As will be appreciated, memory means 404 may be comprised of any type of suitable media, such as ROM, FLASH, EEPROM, etc., and/or may take the form of a chip, a hard disk, a magnetic disk, an optical disk, or the like, in any combination. Still further, it will be appreciated that some or all of the memory means 404 may be physically incorporated within the same IC chip as the microprocessor 400 (a so called "microcontroller") and, as such, is shown separately in FIG. 4 only for the sake of clarity.

To cause the bridge device 206 to perform an action, the bridge device 206 may be adapted to be responsive to events, such as receipt of a communication from smart device 100. In response to an event, appropriate instructions within the program memory (hereafter the "bridge device operating program") may be executed. For example, when a received communication comprises a request to issue a command to a controlled appliance, e.g., TV 106, the bridge device operating program may cause to be retrieved from the codeset data stored in memory 404 a command value and control protocol corresponding to the requested function command and transmit that command to the intended target appliance, e.g., TV 106, in a format recognizable by that appliance to thereby control one or more functional operations of that appliance.

As is known in the art, microcontroller 400 may be placed into a quiescent or "stop" mode by the bridge device operating program. When in such a state, the current drawn from power source 408 may be substantially reduced. By way of example, the aforementioned MAXQ610 microcontroller may draw a nominal 3.75 mA when active (running at a full clock speed of 12 MHz, as determined by crystal 416) but only 0.2 µA when in stop mode, i.e., power consumption is reduced by at least four orders of magnitude when the microcontroller is placed into stop mode. Resumption of processor activity from such a stop mode may be triggered by an external event such as a change in state of an input/output port, etc., and in the case of the exemplary MAXQ610 and similar microcontrollers also by an internal event initiated by a low-speed, low-power, interval timer 418 which may be configured to continue running while the main microcontroller CPU is in stop mode. Such low-power interval timers typically operate at a much lower speed than the primary microprocessor clock, via a secondary crystal or resonator or, as in the case of the exemplary MAXQ610, an internal ring oscillator. By way of example, the MAXQ610 internal "nanopower" ring oscillator operates at a nominal 8 KHz (as contrasted to the primary clock rate of 12 MHz) and consumes only a nominal 40 nA.

In an exemplary embodiment, such a low-power interval timer may be used to provide periodic wake-ups to monitor RF receiver 410 for communications from a smart device, as well as to reduce energy consumption during transmission of appliance commands by bridge device 206, as described for example in co-pending U.S. patent application Ser. No. 13/028,664 entitled "Systems and methods for providing a low power remote control," of common ownership and incorporated herein by reference in its entirety.

It will be appreciated that a bridge device 206, 208, 210, 212 may require configuration when first introduced into a system such as illustrated in FIG. 2. Such configuration may comprise, for example, the identification, and in some embodiments downloading, of codeset data appropriate for the control of the specific appliance brand and model with which the bridge device is to be associated. In order to configure associated bridge devices 206, 208, 210, 212 to command the functional operations of various types of appliances of multiple manufactures and/or models, a remote control app resident in smart device 100 may draw upon a library of command codes and protocol data, i.e., a so-called "universal" library of remote control codesets, as well known in the art. Once identified, the specific codeset to which each of the to-be-controlled appliances is responsive may be provisioned to an associated bridge device 206, 208, 210 or 212. As is known in the art, this may take the form of a pointer or index into a library of codesets pre-stored locally in the memory 404 of a bridge device, e.g. 206; downloading to a bridge device an individual codeset retrieved from a library stored locally in smart device memory 312, on a local PC or appliance such as STB 110 or TV 106 in direct or indirect communication with the bridge device, or from a library stored remotely at a headend or internet accessible server; an item-by-item download of individual commands from a codeset retrieved from any of the above sources on an as-required basis; etc.; as appropriate for a given embodiment.

Figure 5:
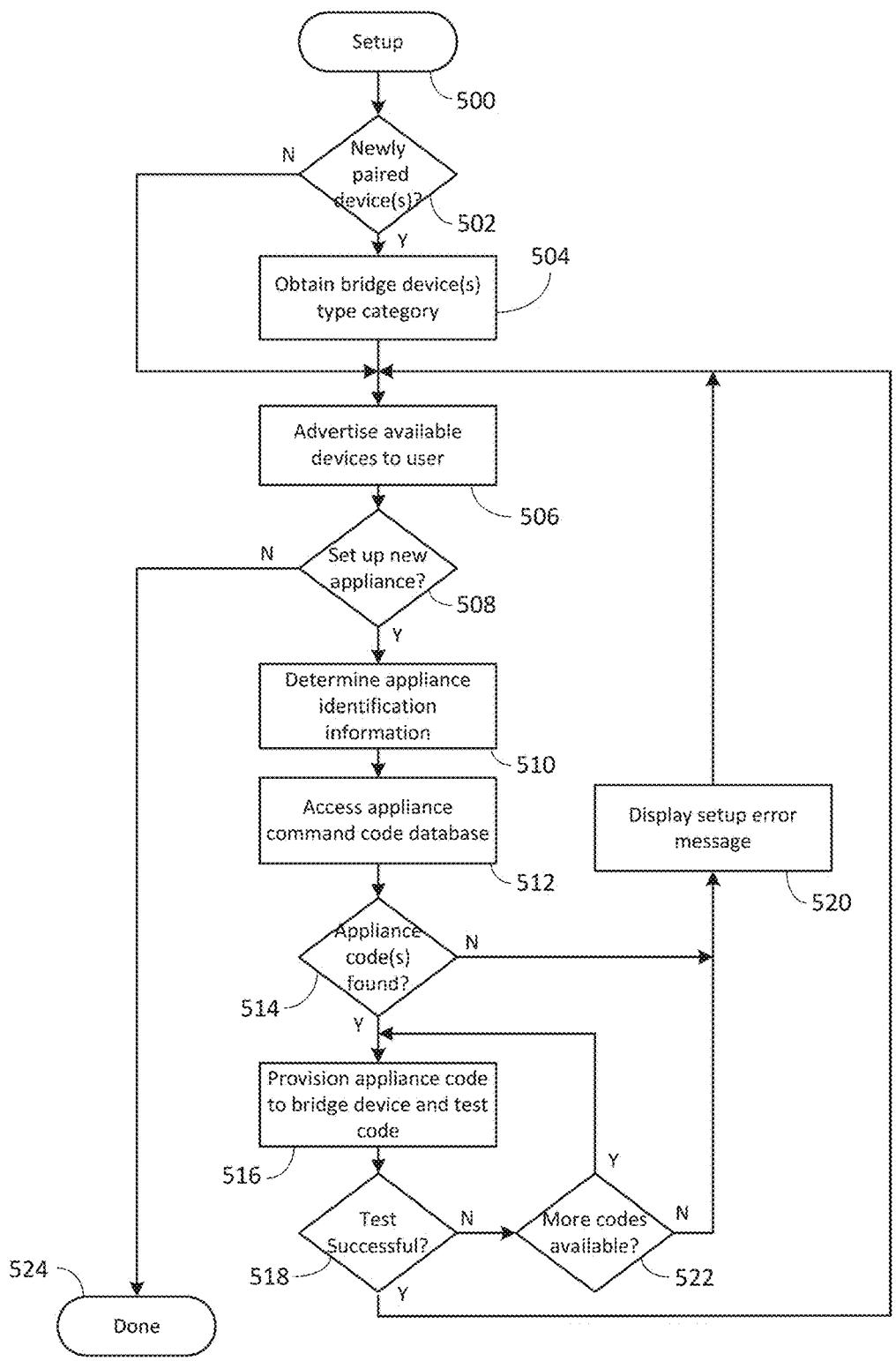
FIG. 5 illustrates in flow chart form a series of steps which may be performed to configure a bridge device of FIG. 2.

Turning now to FIG. 5, there is illustrated by way of further example an exemplary series of steps which may be performed by a smart device remote control app when configuring one or more of the bridge devices described herein. At step 500, the app may initially be placed into a setup mode. Entry into this mode may be as a result of a user action such as activation of a setup icon or selection of an item from within an app internal menu, may be automatic upon detection of a newly-introduced bridge device in the vicinity of the smart device, may be from a smart device system configuration screen, or any other method as appropriate for a particular embodiment. Once in the setup mode, at step 502 the remote control app may first determine if any newly introduced bridge devices are present: if so at step 504 these device(s) may be interrogated to determine the specific appliance category supported by these devices (e.g., TV, AVR, DVR/STB, etc.) with the supported devices being added to a listing of available appliance controllers to be presented to the user at step 506. In this context, it will be appreciated that many networked or point-to-point wireless protocols may include a requirement that a peripheral such as the exemplary bridge device first be "paired" with the smart device (or devices) with which it is to interact, for example via an exchange of tokens, numeric identities, passwords, keys, or the like, typically at the smart device system configuration level. Since such pairing methods are well known in the art and the exact method used is not material to an understanding of the instant invention, these will not be discussed in further detail herein.

At step 508, a user of the remote control may select an appliance controller (i.e., bridge device) to be configured from the list of available appliance types which was displayed at step 506. If no further appliance controllers are to be configured, setup mode is terminated at step 524. If an appliance controller is selected, at step 510 appliance identification information may next be determined. As is known in the art, acquisition of such identification information may comprise user entry of a numeric device code and/or a brand and model number; scanning a bar code, QR code or RFID tag associated with an appliance, for example as described in U.S. Pat. No. 6,225,938, entitled "Universal remote control system with bar code setup," U.S. Pat. No. 7,116, 229, entitled "Programming a remote control device using RFID technology, or U.S. Pat. No. 7,969,514 entitled "System and method for simplified setup of a universal remote control;" deriving information from interaction with the appliance itself, for example as described in U.S. Pat. No. 6,781,518 entitled "Digital interconnect of entertainment equipment" or co-pending U.S. patent application Ser. Nos. 13/198,072 and 13/198,172, both entitled "System and Method for Configuring the Remote Control Functionality of a Portable Device;" capturing pictures of an appliance or its associated OEM remote control, for example as described in U.S. Pat. No. 7,653,212 entitled "System and method for using image data in connection with configuring a universal controlling device;" or any other suitable method. Since such methods to accomplish the acquisition of appliance identification information are well known in the art, for the sake of brevity these will not be further described herein. All of the above referenced U.S. Patents and U.S. patent applications are of common ownership and all are incorporated herein by reference in their entirety.

Once appropriate appliance identification information has been acquired, at step 512 this data may be matched against an appliance command code database in order to identity an appropriate codeset for use in issuing commands to the appliance. Such matching may be performed locally by the smart device resident remote control app; may be performed by an application resident on a local device such as a PC, STB, etc.; may be performed at an Internet-accessible server; or a combination thereof; as appropriate for a particular embodiment. At step 514, if no identification was possible an error message may be displayed at step 520 and processing continues at step 506, i.e., the user is presented with the opportunity to configure further devices or to exit setup mode. If a codeset has been successfully identified, at step 516 this may be provisioned to the associated bridge device using any of the methods described previously, and in some embodiments the user may be directed to test the codeset to verify that the target appliance responds as expected. If it is determined at step 518 that the testing was successful, processing continues at step 506. If testing was unsuccessful, at step 522 it is determined if more than one possible codeset was identified. If so, a further codeset may be provisioned to the bridge device and the test repeated. If no further identified codesets remain, an error message may be displayed at step 520 and processing may continue at step 506, presenting the user with the opportunity to configure further devices or to exit setup mode.

Figure 6:
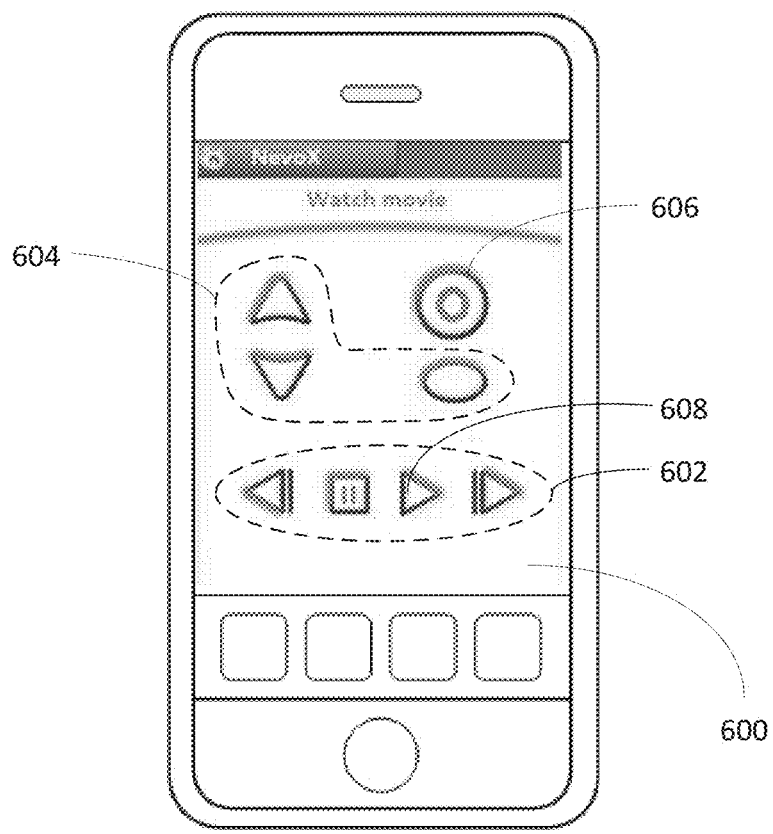
FIG. 6 illustrates an exemplary remote control app GUI as may be implemented on the smart device of FIG. 2.

With reference to FIG. 6, by way of example a remote app resident on smart device 100 of the system illustrated in FIG. 2 may support activity-based operation, e.g., wherein a unified GUI presented to a user may comprise a composite set of command functions drawn from multiple appliances within the system according the functionality required by the particular activity. For example, a "Watch movie" activity, once invoked by a user, may present a GUI 600 comprising a first group of touch activated icons 602 representative of command functions to be directed to DVD player 112, e.g., transport control functions such as "play," "pause," "fast forward," etc.; a second group of touch activated icons 604 representative of command functions to be directed to AV receiver 108, e.g., volume control functions such as volume up/down and mute; and a third icon or group of icons representing "power on" commands for the appliances participating in this activity, e.g., TV 106, AV receiver 108, and DVD player 112. As is known in the art, the power on function may comprise individual command icons for each appliance, or may comprise a single "all power" icon 606 as illustrated in the example presented in FIG. 6, which, when activated, may execute a macro sequence to sequentially issue "power on" commands to each of the appliances. For further detail regarding the definition and set up of such activity-based remote control operation, the interested reader may turn to for example U.S. Pat. No. 8,243,207, entitled "System and Method for Activity Based Configuration of an Entertainment System," or to U.S. patent application Ser. No. 12/632,927, entitled "System and Method for Simplified Activity Based Setup of a Controlling Device," both of common ownership and both incorporated herein by reference in their entirety.

Figure 7:
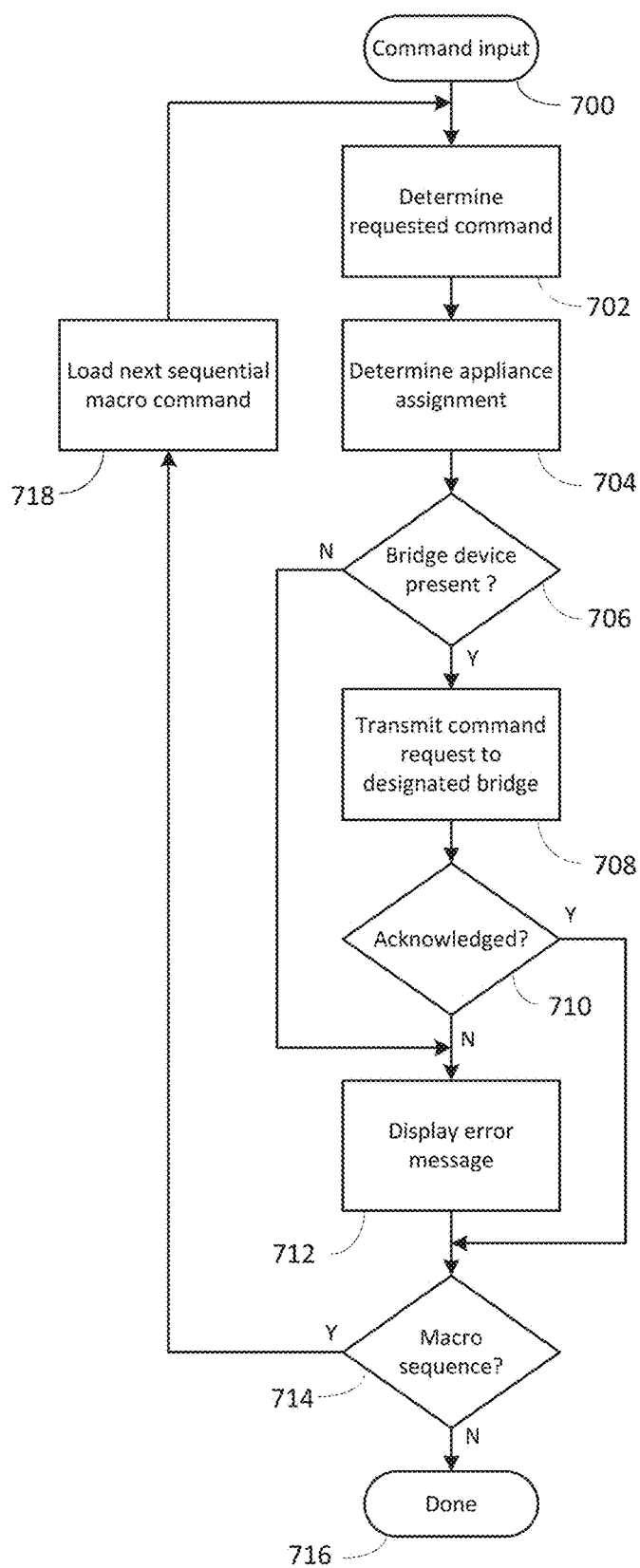
FIG. 7 illustrates in flow chart form a series of steps which may be performed by the remote control app when issuing appliance commands initiated from interactions with the GUI of FIG. 6.

Turning now to FIG. 7, a series of steps performed by an exemplary smart device remote control app in response to user activation 700 of an icon of GUI 600 of FIG. 6 may comprise: Initially, at step 702 the command function associated with the activated icon may be identified, for example "play" 608. Next, at step 704 the appliance type currently assigned to this function may be determined. In the illustrative example, this may be DVD player 112 in accordance with the current activity, e.g., "Watch movie." By way of further explanation, selection of a different activity, for example "Watch cable TV," may result in assignment of a different appliance to this function, e.g. DVR 110. Once the assigned appliance type has been determined, at step 706 it may next be verified that a bridge device corresponding to the desired appliance, e.g., bridge device 212 in the current example, is present and configured, i.e., is paired and has been setup as described previously in conjunction with FIG. 5. If not, processing may continue at step 712 to present an error message to the user of the smart device. If the bridge device is present, at step 708 the desired command request, i.e. "play" in this example, may be forwarded to the appropriate bridge device 212 via RF link 102. Thereafter, at step 710 the remote control app of smart device 100 may wait for an acknowledgement that the command request has been successfully received by the bridge device 212. If no acknowledgement or a negative acknowledgement is received, at step 712 an error message may be presented to the smart device user.

Next, at step 714 it may be determined if the icon activation in step 700 comprised a macro command. If not, or if it was a macro command but all functions in the macro sequence have been completed, processing terminates at step 716. If a macro sequence is underway, the next sequential command request may be loaded at step 718, whereafter processing may continue at step 702 to cause the next command to be issued by an appropriate one of the bridge devices, e.g., 206 through 212.

While various concepts have been described in detail, it will be appreciated by those skilled in the art that various modifications and alternatives to those concepts could be developed in light of the overall teachings of the disclosure.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for issuing commands to control functional operations of an appliance, comprising:
    pairing a smart device with each of a plurality of low-energy consuming controllers, wherein each of the plurality of low-energy consuming controllers is dedicated to controlling functional operations of a one of a plurality of appliances, wherein each of the plurality of appliances is of a different type, and wherein each of the plurality of low-energy consuming controllers has a memory provisioned with a command code set appropriate for commanding functional operations of the one of the plurality of appliances to which the low-energy consuming controllers is dedicated;
    in response to activation of an input element of the smart device, determining by the smart device a type of appliance that is to perform a functional operation that is associated with the activated input element;
    identifying by the smart device a one of the plurality of low-energy consuming controllers with which the smart device is paired that is dedicated to controlling functional operations of the appliance of the determined type;
    transmitting by the smart device for reception by the identified one of the plurality of low-energy consuming controllers an instruction to have the appliance of the determined type perform the functional operation; and
    in response to the identified one of the plurality of low-energy consuming controllers receiving the instruction, using by the identified one of the plurality of low-energy consuming controllers the provisioned command code set that is appropriate for commanding functional operations of the one of the plurality of appliances to which the identified one of the plurality of low-energy consuming controllers is dedicated to transmit a command to cause the performance of the functional operation by the appliance of the determined type.

2. The method as recited in claim 1, wherein the smart device and the plurality of low-energy consuming controllers communicate via a low-energy RF communications channel.

3. The method as recited in claim 1, wherein each the plurality of low-energy consuming controllers transmits a command via an IR communications channel.

4. The method as recited in claim 1, wherein the smart device comprises an app and wherein the app provides a graphical user interface having the input element.

5. The method as recited in claim 1, wherein a command code set is provisioned to each of the plurality of low-energy consuming controllers by being downloaded to each of the plurality of low-energy consuming controllers from the smart device.

6. The method as recited in claim 1, wherein a command code set is provisioned to each of the plurality of low-energy consuming controllers by being downloaded to each of the plurality of low-energy consuming controllers from a server device in communication with each of the plurality of low energy consuming controllers.

7. The method as recited in claim 1, wherein each of the plurality of low-energy consuming controllers is individually paired with the smart device.

8. The method as recited in claim 1, wherein each of the plurality of low-energy consuming controllers is paired with the smart device via use of a new device discovery process.

9. The method as recited in claim 1, wherein the smart device interrogates each of the low-energy consuming controllers to establish a correspondence between each of the low-energy consuming controllers and a type of appliance that each of the low-energy consuming controllers is dedicated to control.

10. The method as recited in claim 1, comprising causing each of the plurality of low-energy consuming controllers to be periodically placed into a quiescent mode wherein power consumed by each of the plurality of low-energy consuming controllers in the quiescent mode is reduced by at least four orders of magnitude as compared to an active mode.

11. The method as recited in claim 1, wherein each of the plurality of low-energy consuming controllers has a memory in which is stored a library of code sets for use in transmitting commands to only appliances of a specific appliance type and wherein the smart device instructs each of the plurality of low-energy consuming controllers to provision a one of the code sets from the library for use in transmitting the command.

* * * * *